July 23, 1946.  F. A. G. PIRWITZ  2,404,526
FLASHLIGHT AND SHUTTER SYNCHRONIZER
Filed March 28, 1944   6 Sheets-Sheet 1
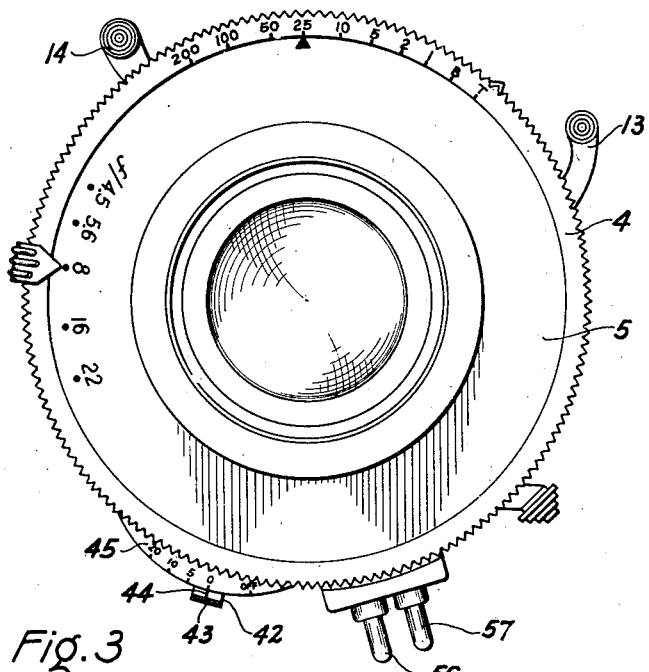
Fig. 1
Fig. 2
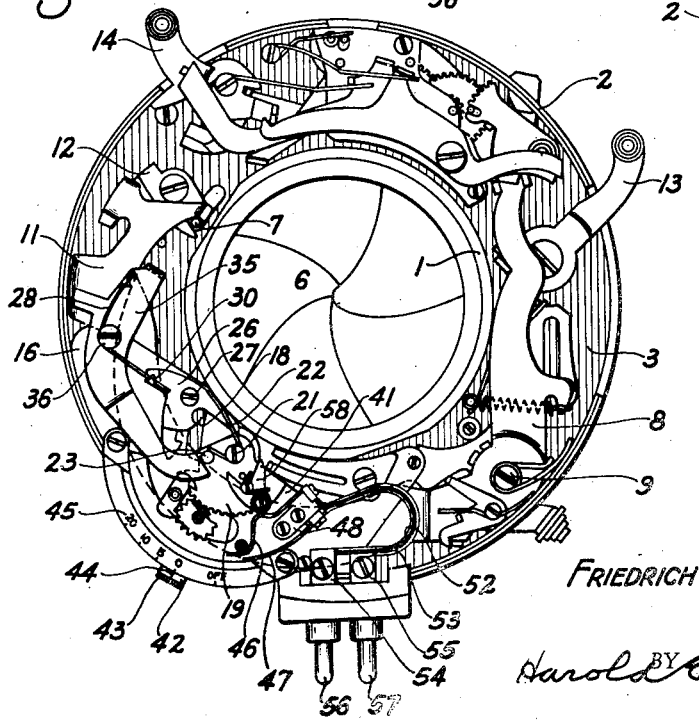
Fig. 3
FRIEDRICH A. GUSTAV PIRWITZ
INVENTOR
BY Harold E. Stonebraker
ATTORNEY

FRIEDRICH A. GUSTAV PIRWITZ
INVENTOR

BY Harold E. Stonebraker
ATTORNEY

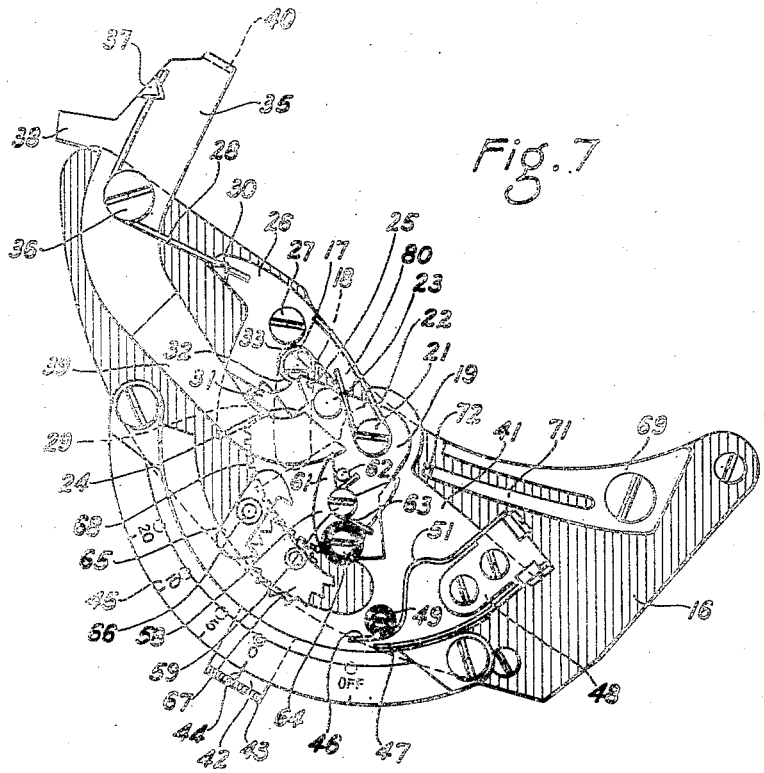

July 23, 1946.　　　F. A. G. PIRWITZ　　　2,404,526
FLASHLIGHT AND SHUTTER SYNCHRONIZER
Filed March 28, 1944　　　6 Sheets-Sheet 4

FRIEDRICH A. GUSTAV PIRWITZ
INVENTOR

BY Harold E. Stonebraker
ATTORNEY

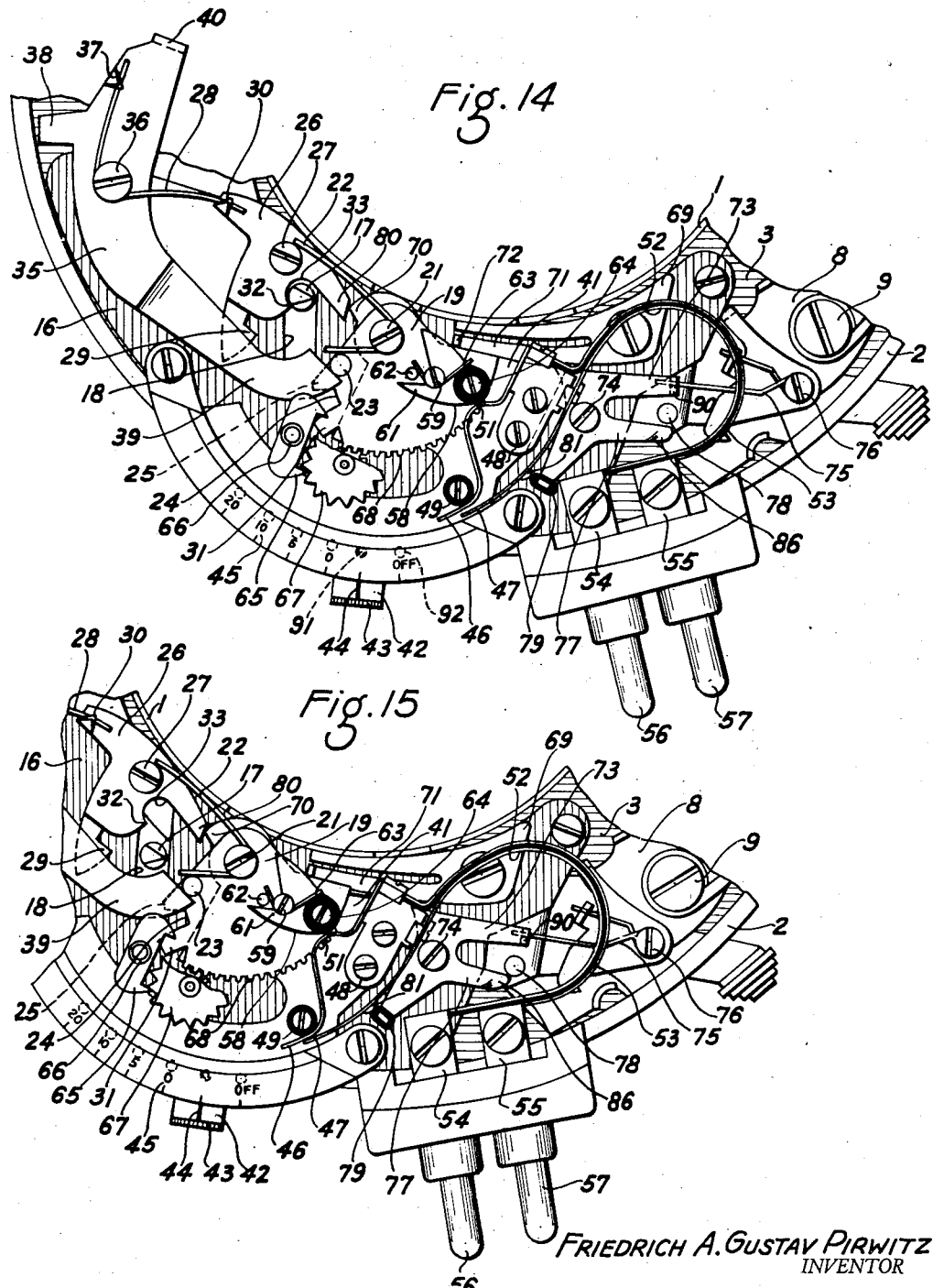

July 23, 1946.  F. A. G. PIRWITZ  2,404,526
FLASHLIGHT AND SHUTTER SYNCHRONIZER
Filed March 28, 1944  6 Sheets-Sheet 6
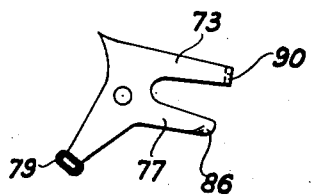
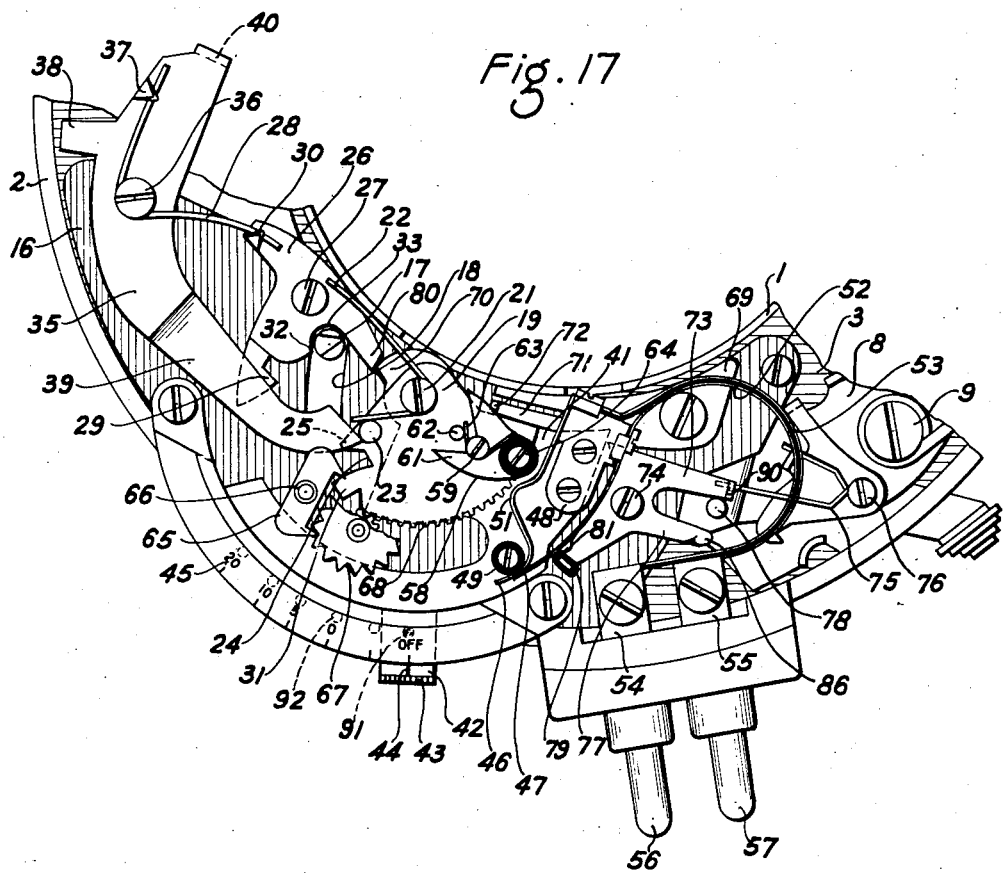
FRIEDRICH A. GUSTAV PIRWITZ
INVENTOR
Harold E. Stonebraker
ATTORNEY

Patented July 23, 1946

2,404,526

UNITED STATES PATENT OFFICE

2,404,526

FLASHLIGHT AND SHUTTER SYNCHRONIZER

Friedrich A. Gustav Pirwitz, Rochester, N. Y., assignor to Wollensak Optical Company, Rochester, N. Y., a corporation of New York Application March 28, 1944, Serial No. 528,422

25 Claims. (Cl. 67—29)

1

This invention relates to a flashlight synchronizing mechanism for photographic shutters, with more particular reference to the set type shutter in which a spring-operated master lever is cocked by a manual operation, and when released by manipulating a trigger, functions to operate the shutter at a preselected speed, and it has for its object to provide a shutter with a flashlight synchronizing mechanism that can be used with lamps having different lag characteristics, and is quickly adjustable to close a flashlight circuit at any predetermined point either before or after initiating opening of the shutter, so that maximum light intensity is assured at the exact moment when the shutter is fully open.

A further purpose of the invention is to provide flashlight synchronizing mechanism that is quickly adjustable to correlate accurately the lag of any lamp with the speed of the shutter to effect simultaneous maximum light intensity and shutter opening, the synchronizing mechanism being operated by spring means independently of the shutter mechanism so that it does not retard or affect the normal operation of the shutter, while at the same time enabling the synchronizing mechanism to be set by the master lever of a set type shutter.

Another object is to provide a set type shutter with a flashlight mechanism in which a spring-operated synchronizing member is set by the setting movement of the shutter master lever and is held in set position by a locking device, while a stop moves into the path of the master lever which, during its initial travel after release, first moves the locking device to release the synchronizing member, and is then held for an instant by the stop which is then moved by the synchronizing member at a predetermined instant, whereupon the master lever completes its travel to open and close the shutter.

A further object is to afford a set type shutter with a master lever and spring-operated synchronizing member arranged for oscillatory movement about independent axes, the master lever being provided with means for engaging and moving the synchronizing member to set position and also to release a locking device that holds the synchronizing member in set position.

An additional purpose is to provide synchronizing mechanism that can be moved out of operative relationship with the master lever of a set type shutter so that the shutter can be used without a flashlight when desired and without necessitating movement of the synchronizing mechanism or affecting the flashlight circuit.

2

Still another object of the invention is to afford a simple, practical, and efficient synchronizing mechanism built into a photographic shutter and located between the usual inner and outer annular walls constituting part of the shutter housing, in conjunction with a switch support that is quickly adjustable in the housing to close the flashlight circuit at different stages in relation to the shutter opening operation, and which is movable to dissassociate the synchronizing mechanism from the shutter mechanism and permit operation of the latter without affecting the flashlight circuit.

A further purpose is to afford a single flashlight circuit switch which may be operated either by a spring-operated synchronizing member for lower speed lamps or by a master lever controlled actuator when a high speed lamp is used with a high speed shutter, with provision for disconnecting the spring-operated synchronizing member when said actuator is used and for disconnecting both circuit closing mechanisms from the master lever to permit operation of the shutter without affecting the flashlight circuit.

An additional purpose of the invention is to afford a photographic shutter flashlight mechanism including a spring-operated synchronizing member movable at such speed in conjunction with an adjustable switch as to adapt the structure for use with an instantaneous flash lamp such as a "Kodatron" lamp, an "SM type" lamp which has a lag of about five milliseconds, or with a standard foil lamp having a lag of from fifteen to twenty milliseconds or more, the mechanism being adaptable to lamps having lags varying from instantaneous to thirty milliseconds by means of an adjustment that causes the maximum light intensity to coincide exactly with the maximum shutter opening.

An additional purpose of the invention is to provide a photographic shutter with a built-in synchronizing mechanism including a spring-operated synchronizing member, an adjustable flashlight circuit switch, and a retarding mechanism connected to the synchronizing member and governing its movement so that the shutter opening operation can be delayed when the circuit is closed first and the circuit closing can be delayed when the shutter is opened first.

An additional object is to afford a photographic shutter flashlight synchronizing mechanism including a switch carried on a quickly adjustable support and located in the path of movement of an actuator mounted on a spring-operated synchronizing member whereby the circuit can readily be closed at any selected point along the path of travel of the actuator.

A further purpose of the invention is to provide flashlight synchronizing mechanism comprising an adjustable switch including contacts mounted on an insulating block and flexibly connected to the shutter housing, the contacts being connected to the two sides of a flashlight circuit and insulated from the shutter housing.

Another object is to afford mechanism enabling an accurate and dependable operation when an instantaneous lamp is used with a shutter of highest speed, and consisting of means operated by the shutter master lever at a predetermined point in its return travel so as to close the circuit after the shutter is fully open and just before it starts to close.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view of a shutter of the set type, illustrating the housing with the cam plate and cover in position, and showing a preferred embodiment of the invention;

Fig. 2 is a side elevation of the same;

Fig. 3 is a plan view of the mechanism with the cam plate and cover removed, illustrating the position of the parts with the shutter closed, the master lever and spring-operated synchronizing member in normal or starting position, and the flashlight circuit switch adjusted to zero position for a lamp having no appreciable lag;

Figure 4:
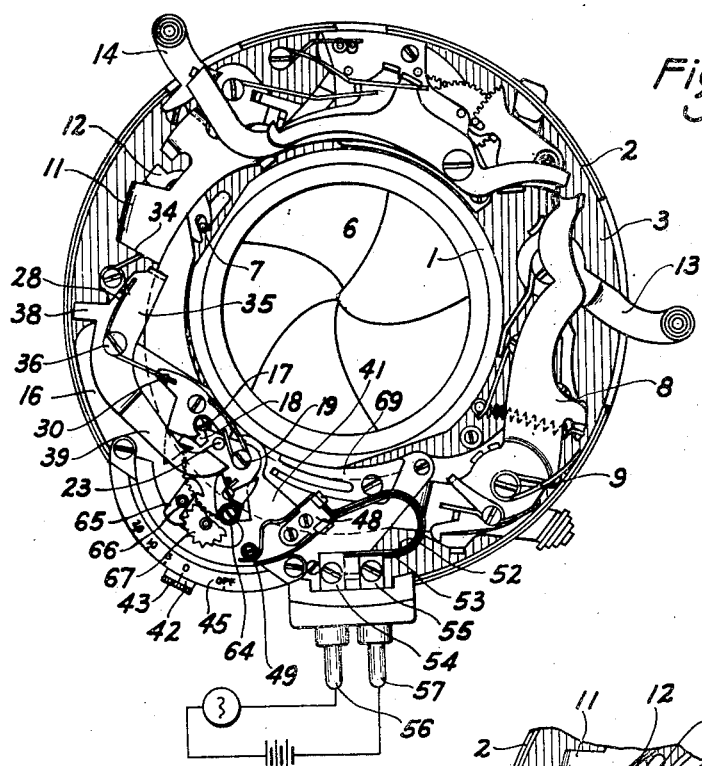
Fig. 4 is a view similar to Fig. 3 showing the position of the parts when the master lever and synchronizing member have been moved to set position and are ready for operation upon movement of the releasing trigger, the flashlight circuit appearing in diagram.
Figure 5:
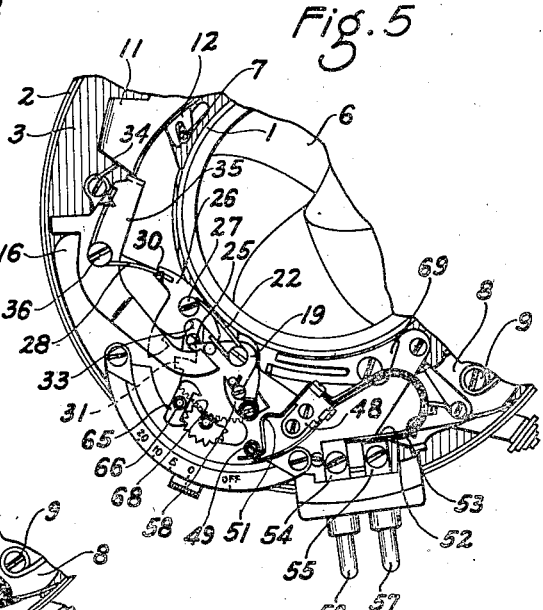
Figure 6:
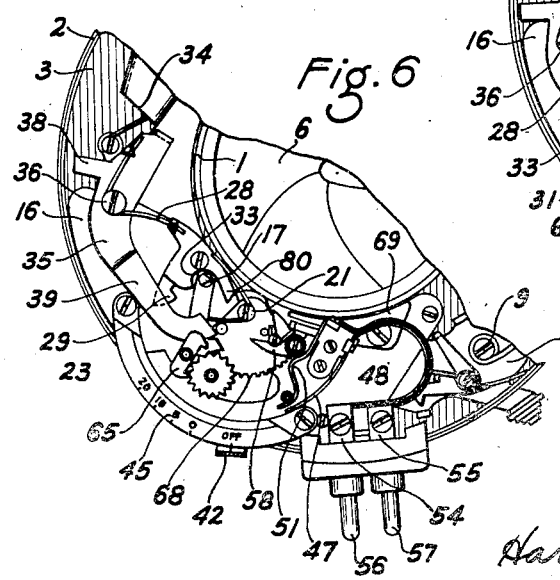
Figure 10:
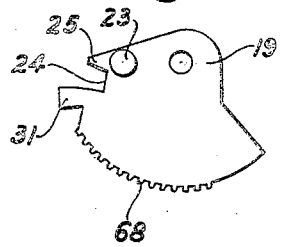
Figure 11:
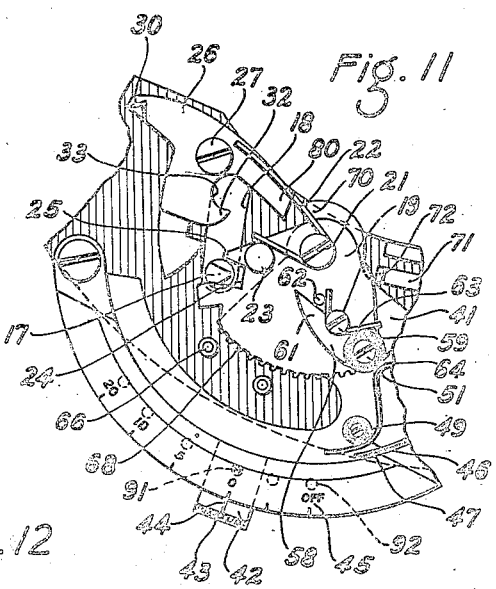
Figure 12:
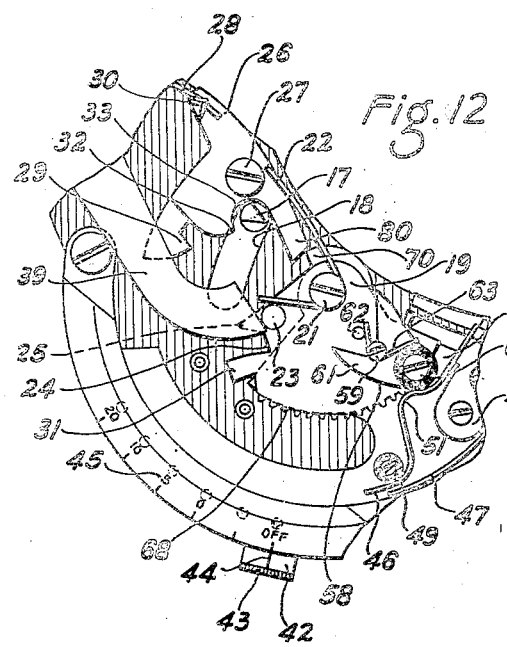
Figure 13:
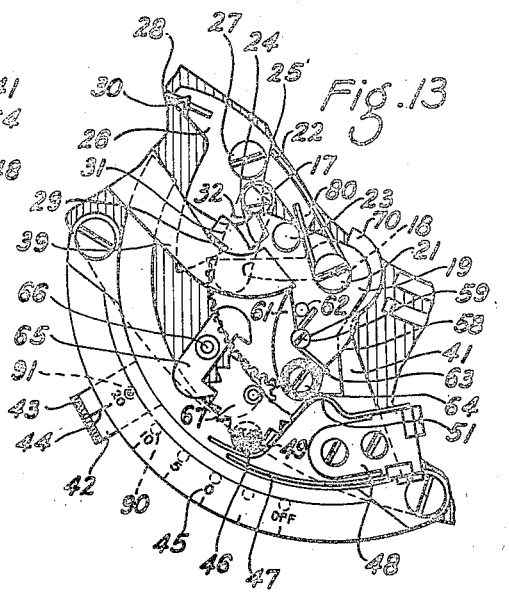

Fig. 5 is a partial plan view of the synchronizing mechanism, showing the position of the parts when the master lever has been released by the trigger for initial return movement, the synchronizing member has been released by the master lever, and the master lever has moved into engagement with its stop previously to movement of the stop by the synchronizing member to release the master lever for final return movement;

Fig. 6 is a view similar to Fig. 5 showing the position of the parts when the synchronizing member has been shifted to disengage it from the master lever and permit operation of the shutter without affecting the flashlight circuit, the master lever appearing in set position;

Fig. 7 is an enlarged detail view of the synchronizing mechanism showing the parts in the position illustrated in Fig. 4, when the synchronizing member has moved to set position and is held by its locking device;

Fig. 8 is a detail view in elevation of the master lever of the shutter mechanism;

Fig. 9 is a detail view in elevation of the adjustable support on which the flashlight circuit closing switch is mounted;

Fig. 10 is a detail view in elevation of the synchronizing member;

Fig. 11 is a detail view illustrating the normal position, before setting, of the synchronizing member and master lever, showing the connection between these parts whereby the master lever when moved to set position effects setting of the synchronizing member, the locking device and retarding mechanism for the synchronizing member being removed;

Fig. 12 is a detail view similar to Fig. 11 showing the relative position of these parts when the synchronizing member is disengaged, to permit operation of the shutter without affecting the flashlight circuit;

Fig. 13 is a detail view with the synchronizing member in set position as in Fig. 4, but with the circuit closing switch adjusted to close the circuit in advance of opening the shutter to accommodate a twenty millisecond lamp;

Fig. 14 is a view in elevation of a modification of the synchronizing mechanism, showing a circuit closing actuator arranged to be engaged and operated directly by the master lever during the latter part of its return movement;

Fig. 15 is a similar view showing the position of the parts when the master lever engages the circuit closing actuator and moves it to circuit closing position;

Fig. 16 is a detail view in elevation of the circuit closing actuator shown in Figs. 14 and 15, and Fig. 17 is a view similar to Fig. 14 showing the position of the parts when the last mentioned actuator and the spring-operated synchronizing member are both disengaged from the master lever to permit operation of the shutter without affecting the flashlight circuit.

The invention is disclosed as embodied in a photographic shutter of the set type such as appears in my earlier Patents Nos. 2,331,568 and 2,331,569, dated October 12, 1943, and it will be understood that such features of the invention as are not necessarily dependent upon a shutter of the set type may be applied to other forms of shutters.

In the photographic flashlight field at the present time, there are available lamps in a rather wide range, some characterized by a lag as high as thirty milliseconds from the instant of closing the circuit until the light is at maximum intensity, while others have no appreciable lag and the maximum light intensity is practically instantaneous upon closing the circuit, and one of the primary objectives of this invention is to construct a synchronizing mechanism that permits using any of the various available lamps and making a quick adjustment of the mechanism so that the maximum light intensity will always occur at the instant when the shutter is fully open. To accomplish this, provision is made for closing the circuit at an adjustable interval in advance of opening the shutter to accommodate low speed lamps, or opening the shutter in advance of circuit closing for high speed lamps, and while for the general range of lamps and shutter mechanisms, these objectives can be satisfactorily attained by a spring-operated synchronizing member that moves under its own power, provision is also made to close the flashlight circuit by a positive direct action of a shutter master lever during the latter part of its return movement, in order to obtain the high degree of accuracy necessary when coordinating a highest speed or instantaneous lamp with a shutter of maximum speed of for instance $1/300$ to $1/600$ part of a second.

These purposes are brought about in general by a spring-operated synchronizing member that is set by the setting movement of the master lever of the shutter and is released by the initial return movement of the master lever, the synchronizing member upon release moving to close the flash circuit switch which is adjustable to any preselected point in the path of movement of the synchronizing member, while the final return movement of the master lever and opening of the shutter is dependent upon the synchronizing member and occurs at a predetermined point in the travel of the latter.

Referring more particularly to the drawings, and to Figs. 1 to 3, 1 and 2 designate the inner and outer annular walls of the shutter housing, 3 is the bottom wall of the housing, 4 the adjustable cam plate, 5 the stationary index cover plate, and 6 are the shutter leaves connected to and operated by a shutter ring, not shown. The shutter ring carries a pin 7 that is alternately moved in opposite directions to open and close the shutter during the return movement of the master lever 8 which is pivoted on the post 9 and has an operating portion 11 that during its return movement operates a shutter actuating lever 12 to open the shutter and then engages the pin 7 to close the shutter.

13 designates the setting lever that is manually operated to move the master lever 8 to set position, and 14 designates the trigger that is manually operated to release the master lever 8 to permit return movement of the latter for opening and closing the shutter when an exposure is to be made. The mechanism thus far described is the same as in my earlier patents referred to above and need not be described in greater detail as it forms no part of the invention except insofar as the master lever 8 controls and operates the flashlight synchronizing mechanism that will now be described.

Referring to Fig. 7, 16 designates a stationary base plate suitably mounted in the housing and located above the master lever 8 for supporting the synchronizing mechanism which is operated to set position, as shown in Fig. 7, by a pin 17 fixedly carried on the master lever 8, see Figs. 7 and 8, and extending therefrom upwardly through the slot 18 in the supporting plate 16, the slot 18 permitting the necessary movement of the pin 17 as the master lever travels back and forth.

The synchronizing mechanism includes a synchronizing member 19 consisting of a generally segmental plate that is pivoted on a post 21 for swinging movement between the inner and outer annular walls of the housing and is actuated by a coil spring 22 surrounding post 21 with one end abutting the inner wall of the housing while the other end engages pin 23 carried by the synchronizing member 19. The synchronizing member 19 is provided with a recess 24 that receives the pin 17, see Fig. 11, when the parts are in initial or unset position, with the tapered edge of the pin 17 located under the nose 25 of the synchronizing member, which is thus in position to be lifted by the pin 17 when the master lever moves to set position. Such action of the master lever carries the synchronizing member from initial position, as illustrated in Figs. 3 and 11, to set position as shown in Fig. 7, whereupon the synchronizing member is held by a locking device 26 pivoted at 27 on the base plate and held in locking position by a spring 28 engaging lug 30 on the locking device.

The locking device 26 includes a latch 29 that cooperates with a projection 31 on the synchronizing member to hold the latter, said projection engaging the curved edge of said latch and swinging the locking member out of engagement during setting movement of the synchronizing member, and the pin 17 engages the curved edge of nose 32, holding the locking device out of locking position, until pin 17 moves far enough to release nose 25, whereupon recess 33 permits the locking device to swing counterclockwise toward pin 17 so that latch 29 engages projection 31, holding the synchronizing member, as shown in Fig. 7, in set position until released in the manner that will presently be described. The latch portion 29 of the locking device is in the same plane with projection 31 and offset from the body of the locking device so that the projection 31 can ride over the nose 32 of the locking device during the setting operation.

The synchronizing member is thus moved to set position by the master lever 8 as the latter moves to set position under the impulse of the manual setting lever 13, and when the synchronizing member is released in the manner that will now be described, it moves under the impulse of the spring 22 to effect closing of the flashlight circuit. Upon release of the master lever by operation of the trigger 14, as in the usual shutter operation, the pin 17 travelling downwardly from the position shown in Fig. 7 first engages nose 32 of locking device 26, located just under the recess 33 that receives the pin 17, thus causing the locking device to be tilted clockwise on its pivot 27 against the action of spring 28 in the manner shown in Fig. 5.

This releases projection 31 of the synchronizing member from the latch 29 so that the synchronizing member is free to swing on its pivot 21, and this movement of the parts takes place during the initial return movement of the master lever from the position shown in Fig. 4 to that shown in Fig. 5. At this instant, the shoulder 34 of the master lever engages a stop 35, see Fig. 5, which is pivotally mounted on a post 36 and held in the position illustrated in Figs. 4 and 5 by means of the aforementioned coil spring 28 surrounding the post 36 and having one end engaging a lug 37 on the stop 35 while its other end engages the lug on the aforementioned locking device 26. 38 designates an extension carried by the stop 35 and engageable with the outer annular wall of the housing to limit movement of the stop in such direction.

The stop 35 includes a tail piece 39, see Fig. 7, which is in position to be engaged by the pin 23 on the synchronizing member, the normal position of the stop 35 being shown in Fig. 3. The stop has a downwardly turned lug 40 at its end, adapted to ride over the body of the master lever to the position shown in Figs. 3 and 6, and to engage in front of the offset shoulder 34 of the master lever, as shown in Figs. 4 and 5.

When the master lever and synchronizing member are moved to set position, the stop moves under the impulse of its spring 28 anticlockwise and is then in position to arrest return movement of the master lever after the latter has moved the slight distance required to release the synchronizing member as already described. Following this, the master lever is held against further return movement until the synchronizing member has moved sufficiently to shift the tail piece 39 of the stop so as to move the latter out of engagement with the master lever, as shown in Fig. 3. The master lever is then free to complete its return movement to effect opening and closing of the shutter, and it will be observed that the opening movement of the shutter cannot take place until the synchronizing member has moved far enough to actuate the stop 35 and release the master lever for this purpose.

During the movement of the synchronizing member just described, the flashlight circuit is closed at a selected point in the travel of the synchronizing member, dependent upon the adjusted position of the flashlight circuit switch, in a manner that will now be described, and while the master lever is always released at the same instant in relation to the travel of the synchronizing member, the flashlight circuit can be closed at various stages in the travel of the synchronizing member depending upon the position of the adjustable switch. Thus the flashlight circuit can be closed at any desired interval in advance of opening the shutter or after the shutter is opened, and closing of the circuit by means of the adjustable switch is accomplished by the following mechanism.

Referring to Figs. 7 and 9, 41 designates an adjustable support that is pivotally mounted on the post 21 coaxially with the synchronizing member and located beneath the latter for positioning at any selected point to accommodate lamps having different characteristic lags. To effect this adjustment, the support 41 is provided with an extension or finger piece 42 projecting through an opening in the outer annular wall 1 of the housing and having a knurled edge 43, while 44 is an index mark cooperating with the fixed scale 45 carried by the housing. The adjustable support can be moved along the scale to any selected position and is held in adjusted position by frictional engagement between the extension 42 and the edge of the housing wall adjacent the slot through which it extends, or by a projection 91 on the extension engaging in openings 92 on the under side of the scale, see Fig. 11.

Mounted on the adjustable plate 41 is the flashlight circuit switch consisting of the spring contacts 46 and 47 attached to an insulating block 48 also mounted on the adjustable support 41. The contact 46 at its outer end normally engages an insulated post 49 mounted on the adjustable support 41, and includes a cam portion 51 located in the path of the actuator which engages cam portion 51 to move contact 46 into engagement with contact 47 and close the circuit, as will appear presently. The fixed ends of the contacts 46 and 47 are connected by flexible conductors preferably in the form of flexible metal strips 52 and 53, see Figs. 4 to 6, which are insulated from each other, and fixedly connected at their outer ends to conducting elements 54 and 55 mounted on the housing, and these are in turn connected to the jacks 56 and 57, adapted to receive a detachable plug and to be connected to the flashlight circuit as shown in Fig. 4.

The flexible connections 52 and 53 permit locating the jacks 56 and 57 stationarily on the shutter housing while the switch itself is adjustable throughout the desired range to accommodate any of the conventional flash lamps, some of which have no appreciable lag and are substantially instantaneous while others have a lag up to twenty or thirty milli-seconds between the instant of circuit closing and the instant of maximum light intensity, and with this construction, both contacts and both flexible conductors are insulated from the shutter housing and mechanism and neither side of the circuit is grounded through the shutter mechanism, as has been the practice in synchronizer structures heretofore.

The flashlight circuit is closed by movement of contact 46 into engagement with the contact 47, see Fig. 7, when the synchronizing member moves sufficiently to bring about this action, which is accomplished by an actuator on the synchronizing member engaging the cam portion 51 of contact 46. This actuator is designated generally at 58 and is pivotally mounted on the post 59 of the synchronizing member. The actuator 58 includes a tail piece 61 engageable with a stop pin 62 on the synchronizing member and actuated against said pin by a spring 63 coiled around the post 59, and having one end bearing against pin 62 while its other end bears against the insulated pin 64 which is carried by the actuator and engages the cam portion 51 of the contact 46 as the synchronizing member moves past the switch under the action of the synchronizer spring 22. This brings contact 46 into engagement with contact 47 to close the circuit for an instant to effect flashing of the lamp after which the pin 64 moves beyond the cam portion 51 of the contact, and the latter is released and returns to its normal position against post 49.

During movement of the synchronizing member to set position, illustrated in Fig. 7, from the initial position illustrated in Fig. 3, the pin 64 rides over the cam portion 51 without moving the contact or affecting the circuit, since actuator 58 can tilt anticlockwise on its pivot 59, the tail piece 61 swinging away from pin 62 against the action of spring 63, thus permitting the actuator to travel in one direction when setting the synchronizing member without moving the contact 46, while during movement of the synchronizing member in the opposite direction when released, the tail piece 61 is held against pin 62 and cannot move further in a clockwise direction, so that when the pin 64 engages cam portion 51 of the contact, the latter is moved to close the circuit.

The circuit closing operation may take place early in the movement of the synchronizing member for a lamp having a long lag characteristic, as shown in Fig. 13, or may take place late in the travel of the synchronizing member for a lamp having little or no lag and characterized by instantaneous lighting, as indicated in Fig. 7. It is desirable to retard movement of the synchronizing member after its release in order to delay opening the shutter when the circuit is closed first or to delay closing the circuit when the shutter is opened first, and this is accomplished by a retarding mechanism consisting of an escapement pawl 65 mounted on a post 66 and engaging an escapement wheel 67 mounted on an arbor and carrying a pinion engaging a toothed rack 68 formed on the edge of the synchronizing member, the escapement pawl 65 and escapement wheel 67 being located above the synchronizing member and actuator to permit movement of the last mentioned parts.

When the synchronizing member is in its normal position, as illustrated in Figs. 3 and 11, it is held in position for engagement by the pin 17 on the master lever with the nose 25 by yieldable spring means consisting of a plate 69, see Fig. 7, attached to the supporting plate 16. The plate 69 is slotted to afford a yieldable tongue 71 provided at its end with an upstanding lug 72 that engages against the adjacent edge of the synchronizing member when the latter is in initial position, limiting its return movement and overcoming the action of spring 22 sufficiently to hold the synchronizing member in position to be engaged and moved to set position by the master lever. The lug 72 also engages the pivoted actuator 58 on the synchronizing member when the latter reaches the limit of its movement, as shown in Figs. 3 and 11, tilting the actuator so as to move the pin 64 and insure release of contact 46 and opening the circuit.

When it is desired to operate the shutter without a flashlight and without closing the circuit, it is desirable to disengage the synchronizing member from the master lever so that the movable parts of the synchronizing mechanism can remain idle while the shutter is operated, and this is effected by moving the adjustable support 41 in an anticlockwise direction to the "off" position, where it engages the upstanding lug 72, and shifts the latter toward the body of plate 69, permitting further return movement of the synchronizing member until the latter is out of the path of the pin 17 of the master lever, as shown in Fig. 12. When the switch support is thus adjusted, the master lever can be operated and pin 17 can travel back and forth in the slot 18 without causing any movement of the synchronizing member. In this position, the locking device 26 is held out of the path of the pin 17 by the extremity 70 on the adjustable support, see Figs. 9 and 12, engaging the end 80 of the locking device and tilting the locking device clockwise, so that the pin 17 on the master lever is free to move without causing movement of the locking device.

The operation of the structure thus far described is briefly as follows: The switch is first adjusted to the desired position by manipulating finger piece 42 along the scale 45 in accordance with the particular lamp that is being used, and the flash lamp being connected in the circuit, the parts are ready for operation. The shutter master lever is set in the usual fashion by operating the setting lever 13, and this movement of the master lever, through its pin 17, causes the synchronizing member to be moved to set position, from the initial position shown in Fig. 3 to the position shown in Fig. 7, the synchronizing member being held in such position by the locking device 26. When it is desired to make an exposure, the trigger 14 is operated manually as usual in a shutter operation and this releases master lever 8 which moves initially from the position shown in Fig. 4 to the position shown in Fig. 5. This slight partial return movement of the master lever is sufficient to cause pin 17 to engage and move the locking device 26 out of locking engagement with the projection 31 of the synchronizing member, which is thus released and free to move under the action of its spring 22 and carry the actuator 58 with pin 64 into engagement with the cam portion 51 of contact 46 and move said contact to effect operation of the switch and close the flash lamp circuit. During this return movement of the synchronizing member, the pin 23 carried by it engages the tail piece 39 of stop 35, swinging the latter clockwise on its pivot 36 until stop 35 is disengaged from the master lever and permitting the latter to return to the position shown in Fig. 3. During this final return movement, the master lever opens and closes the shutter, and this shutter opening and closing operation can take place either after or before the flashlight circuit is closed, depending upon the position of the switch. By suitably adjusting the latter, the circuit closing and shutter opening operations can be so timed and related as to bring the maximum light intensity at exactly the instant when the shutter is fully open. If desired to operate the shutter without a flashlight, the switch support is manipulated as already described to its "off" position, permitting the synchronizing member to move out of operative relation with the master lever and thus freeing the moving parts of the synchronizing mechanism from wear and tear when the shutter is used without a flash lamp.

In some instances where an instantaneous or "no lag" lamp is employed with a shutter of very high speed, as from $1/300$ to $1/600$ of a second, it is difficult to maintain the proper relationship between movement of the spring-operated synchronizing member and the master lever, and it may be desirable in such instances to effect closing of the flash circuit by positive action of the master lever during or toward the end of the latter part of its return movement so as to insure closing the circuit at the exact instant when the shutter is fully open and at a definite fixed point in the travel of the master lever, instead of depending upon the operation of an independently moving spring-operated unit, as in the arrangement already described.

This result is brought about by the structure shown in Figs. 14 to 16 in which there is provided a supplemental actuator 73 pivoted at 74 on the supporting plate 16 and held in normal position by a spring 75 suitably mounted on a post 76 on the master lever, the spring 75 having one end engaging a tongue on the master lever and the other end engaging a downwardly extending portion 90 on the supplemental actuator 73, which portion 90 engages a part of the supporting plate 16 to limit movement of the actuator 73. 86 designates a latch portion on the actuator 73 at the end of the arm 77 and located in the path of a lug 78 on the master lever. 79 designates an insulated pin on the actuator 73 arranged to engage a suitable abutment or cam portion 81 on the contact 47 of the switch when the switch support is adjusted to the proper position, and operable to move said contact 47 toward and into engagement with the contact 46 to close the circuit when the supplemental actuator 73 is rocked clockwise on its pivotal axis 74.

During setting movement of the master lever, the lug 78 on the master lever rides under the latch portion 86 without affecting movement of the actuator, while during return movement of the master lever, the lug 78 engages the latch portion 86 and swings the actuator 73 clockwise against the action of spring 75 and in such a manner as to close the circuit during the latter part and toward the end of the return movement of the master lever. Thus the flashlight circuit is not closed until the fully open position of the shutter or until the master lever has moved far enough to insure opening the shutter to its fullest extent at the instant of the flash, and by this arrangement the instant of maximum light intensity can be made to occur at the precise instant when the shutter is fully open and the mechanism will continue to operate in this fashion without its accuracy or dependability being affected by repeated operations.

As already described, the switch can be adjusted to any point to effect closing of the circuit in advance of opening the shutter. When adjusted to "zero" position, the shutter closes in advance of the instant of closing the circuit, and when the switch support is adjusted to the position shown in Fig. 11 to position it for operation by the second actuator 73, it will have moved far enough to engage lug 72 on the yieldable spring member 71, see Fig. 6, thus disengaging the spring-operated synchronizing member from operative relation with the master lever when the switch is adjusted for operation by the second actuator 73.

The second actuator 73 cooperates to close the flashlight circuit only when the switch is in one position with the cam portion 81 on contact 47 located in the path of the pin 79 on actuator 73, and when the supporting plate which carries the switch is moved further until the index on the hand piece coincides with the "off" position on the scale, the supporting plate will then have moved far enough to engage the tip 81 of the second actuator and swing the latter clockwise against the action of its spring until its latch portion is moved out of the path of the lug on the master lever so that the latter can be moved for operating the shutter without moving either the spring-operated synchronizing member or the second actuator. When the parts are in this position, the shutter is operable without affecting the flash lamp circuit.

The second actuator just described is intended to be used for controlling the flashlight circuit only in the case of a very high speed shutter with a range of from 1/300 to 1/600 part of a second or less, in which case it is desirable to open the shutter considerably in advance of the circuit closing operation and to effect closing of the flash lamp circuit toward the latter part of the return movement of the master lever. This insures the shutter being fully open when the circuit is closed so that the instant of maximum light intensity, which occurs almost simultaneously with the closing of the circuit in the case of a "no lag" lamp, will be effective at the moment when the shutter is open to the greatest extent.

Thus the mechanism provides for closing the circuit considerably in advance of the shutter opening operation, slightly in advance of the shutter opening operation, or slightly after the shutter opening operation, any one of these relationships being effective with the spring-operated synchronizing member that is released upon return movement of the master lever, while by adjusting the switch for operation by the second actuator, which is moved positively by the master lever during the latter part of its return movement, closing of the circuit can be made to occur after the shutter is fully opened and while in such fully open position. By this operation, proper and effective control can be had of a "no lag" lamp with a maximum speed shutter, in a manner that insures closing the circuit always at the same instant in relation to the size of the shutter opening, by a mechanism that is positive, dependable, is not likely to get out of order or require adjustment, and which does not adversely affect the operation or mechanism of the shutter itself.

While the invention has been described with reference to a certain structural embodiment, it is not confined to the details herein disclosed, and this application is intended to cover such modified arrangements as may come within the purposes of the improvements or the scope of the following claims.

I claim:

1. In a photographic shutter, the combination with a shutter housing including inner and outer annular walls, of a spring-operated flashlight synchronizing member pivotally mounted and having swinging movement between said side walls at one side of the housing, an actuator mounted on said synchronizing member, a shutter controlling master lever operating to set and release the synchronizing member, and a flashlight circuit switch located in the housing and including a pair of normally spaced spring contacts insulated from the housing and one of which has a cam portion located in the path of movement of said actuator which travels into and out of engagement with said cam portion during its travel in one direction whereby the spring contacts are engaged with each other for an instant during the circuit-closing movement of the actuator and are spaced from each other when the actuator is at either limit of its path of travel.

2. In a photographic shutter, the combination with a shutter housing including inner and outer annular walls, of a spring-operated flashlight synchronizing member pivotally mounted and having swinging movement between said walls at one side of the housing to close a circuit, an actuator mounted on said synchronizing member, a shutter controlling master lever operating to set and release the synchronizing member, and a flashlight circuit switch quickly adjustable in the housing, said switch including a pair of normally spaced spring contacts, a frictionally held adjustable insulating block on which said contacts are mounted, one of said contacts having a cam portion located in the path of movement of said actuator which moves successively into and out of engagement with said cam portion during its travel in one direction whereby the contacts are engaged with each other for an instant during circuit-closing movement of the actuator and are spaced from each other when the actuator is at either limit of its path of travel.

3. In a photographic shutter, the combination with a shutter housing including inner and outer annular walls, of a spring-operated flashlight synchronizing member pivotally mounted for swinging movement between said walls at one side of the housing to close a circuit, a locking device engageable with the synchronizing member to hold it in set position, a manually controlled lever engageable with the synchronizing member to move it to set position and engageable with the locking device to release the synchronizing member, an actuator pivotally mounted on said synchronizing member, and a flashlight circuit switch located in the housing and including a pair of normally spaced spring contacts insulated from the housing and one having a cam portion arranged in the path of movement of said actuator which moves successively into and out of engagement with said cam portion during its travel in one direction whereby the contacts are engaged with each other for an instant during circuit-closing movement of the actuator and are spaced from each other when the actuator is at either limit of its path of travel.

4. In a photographic shutter, the combination with a shutter housing including inner and outer annular walls, of a spring-operated flashlight synchronizing member pivotally mounted for swinging movement between said walls at one side of the housing to close a circuit, a locking device engageable with the synchronizing member to hold it in set position, a manually controlled lever engageable with the synchronizing member to move it to set position and engageable with the locking device to release the synchronizing member, an actuator pivotally mounted on said synchronizing member, and a flashlight circuit switch located in the housing in the path of movement of said actuator and adjustable along said path, said switch including a pair of normally spaced spring contacts mounted on an adjustable insulating block, and flexible metal conductors connected at one end to said contacts and fixedly attached at the other end to the housing and insulated therefrom, one of said contacts having a cam portion located in the path of movement of said actuator which moves successively into and out of engagement with said cam portion during its travel in one direction whereby the contacts are engaged with each other for an instant during circuit-closing movement of the actuator and are spaced from each other when the actuator is at either limit of its path of travel.

5. In a photographic shutter, the combination with a shutter housing including inner and outer annular walls, of a spring-operated flashlight synchronizing member pivotally mounted and having swinging movement between said walls at one side of the housing to close a circuit, an actuator pivotally mounted on the synchronizing member, a shutter controlling master lever operating to set and release the synchronizing member, and a flashlight circuit switch quickly adjustable in the housing and including a pair of normally spaced spring contacts insulated from the housing and one having a cam portion located in the path of movement of said actuator which moves successively into and out of engagement with said cam portion during its travel in one direction whereby the contacts are engaged with each other for an instant during circuit-closing movement of the actuator and are spaced from each other when the actuator is at either limit of its path of travel.

6. In a photographic shutter, the combination with a shutter operating lever, of a spring-operated flashlight synchronizing member, means on the shutter operating lever acting to engage and set the synchronizing member, means controlled by the shutter operating lever acting to release the synchronizing member in advance of the shutter opening movement, an actuator on the synchronizing member, and a flashlight circuit switch adjustably located in the path of movement of said actuator and operable to effect closing of a flashlight circuit in advance of or after the shutter opening movement in accordance with the position of the switch.

7. In a photographic shutter of the settable type, the combination with a shutter housing including inner and outer annular walls and a master lever controlling the shutter, of a spring-operated flashlight synchronizing member pivotally mounted for swinging movement to close a circuit independently of the master lever between said walls at one side of the housing, an actuator carried by said synchronizing member, a flashlight circuit switch located in the housing in the path of movement of said actuator, a locking device for the synchronizing member, and means on the master lever cooperating with the synchronizing member to move it to set position when the master lever is set and to move the locking device and release the synchronizing member after the master lever is released.

8. In a photographic shutter of the settable type, the combination with a master lever which during its return movement after release effects opening and closing of the shutter, of a spring-operated synchronizing member movable independently of the master lever, means on the master lever engageable with the synchronizing member and acting to set the latter as the master lever moves to set position, a locking device engageable with the synchronizing member and acting to hold it in set position, manually controlled means acting to release the synchronizing member, an actuator on said synchronizing member, and a flashlight circuit switch in the path of movement of said actuator.

9. In a photographic shutter of the settable type, the combination with a master lever controlling the shutter, of a spring-operated flashlight synchronizing member movable independently of the master lever, an actuator carried by said synchronizing member, a flashlight circuit switch located in the path of movement of said actuator, and means on the master lever cooperating with the synchronizing member to move it to set position when the master lever is set and to release it after the master lever is released.

10. In a photographic shutter of the settable type, the combination with a master lever which during its return movement after release effects opening and closing of the shutter, and a flashlight circuit switch, of a spring-operated synchronizing member, an actuator on said synchronizing member engageable with said switch to close the circuit, and cooperating means on the master lever and synchronizing member acting to set and release the synchronizing member by respectively setting and releasing the master lever.

11. In a photographic shutter of the settable type, the combination with a master lever which during its return movement after release effects opening and closing of the shutter, and a flashlight circuit switch, of a spring-operated synchronizing member, an actuator on said synchronizing member engageable with said switch to close the circuit, means on the master lever engageable with the synchronizing member and acting to set the latter as the master lever moves to set position, a locking device engageable with the synchronizing member and acting to hold it in set position, means on the master lever engageable with said locking device and acting to move it and release the synchronizing member during the initial part of the return movement of the master lever, a stop movable into the path of the master lever acting to hold the latter after release of the synchronizing member, and means on the synchronizing member engageable with said stop to move the latter and release the master lever for further return movement when the synchronizing member reaches a predetermined point in its travel.

12. In a photographic shutter of the settable type, the combination with a master lever which during its return movement after release effects opening and closing of the shutter, of a spring-operated synchronizing member, means on the master lever engageable with the synchronizing member and acting to set the latter as the master lever moves to set position, a locking device engageable with the synchronizing member and acting to hold it in set position, means on the master lever engageable with said locking device and acting to move it and release the synchronizing member during the initial part of the return movement of the master lever, a stop movable into the path of the master lever and acting to hold the latter after release of the synchronizing member, means on the synchronizing member engageable with said stop to move the latter and release the master lever for further return movement when the synchronizing member reaches a predetermined point in its travel, an actuator mounted on the synchronizing member, and a flashlight circuit switch adjustably positionable in the path of said actuator.

13. In a photographic shutter of the settable type, the combination with a master lever which during its return movement after release effects opening and closing of the shutter, of a spring-operated synchronizing member, means on the master lever engageable with the synchronizing member and acting to set the latter as the master lever moves to set position, a locking device engageable with the synchronizing member and acting to hold it in set position, an actuator on the synchronizing member, a flashlight circuit switch in the path of movement of the actuator, manually controlled means acting to release the synchronizing member, and means acting automatically to effect return movement of the master lever after release of the synchronizing member.

14. In a photographic shutter of the settable type, the combination with a master lever which during its return movement after release effects opening and closing of the shutter, of a spring-operated synchronizing member, means on the master lever engageable with the synchronizing member and acting to set the latter as the master lever moves to set position, a locking device engageable with the synchronizing member and acting to hold it in set position, manually controlled means operable to release the synchronizing member, means operated by the synchronizing member acting to release the master lever when the synchronizing member reaches a predetermined point in its travel, an actuator on said synchronizing member, and a flashlight circuit switch adjustable along the path of movement of said actuator.

15. In a photographic shutter of the settable type, the combination with a master lever which during its return movement after release effects opening and closing of the shutter, of a spring-operated synchronizing member, cooperating means on the master lever and synchronizing member acting to set and release the synchronizing member by respectively setting and releasing the master lever, an actuator on said synchronizing member, and a flashlight circuit switch adjustable along the path of movement of said actuator.

16. In a photographic shutter of the settable type, the combination with a master lever which during its return movement after release effects opening and closing of the shutter, of a spring-operated synchronizing member pivotally mounted for swinging movement about an axis independent of the axis of the master lever, cooperating means on the master lever and synchronizing member acting to set and release the synchronizing member by respectively setting and releasing the master lever, an actuator on the synchronizing member, and a flashlight circuit switch located along the path of movement of said actuator.

17. In a photographic shutter of the settable type, the combination with a housing, and a master lever which during its return movement after release effects opening and closing of the shutter, of a spring-operated synchronizing member, cooperating means on the master lever and synchronizing member acting to set and release the synchronizing member by respectively setting and releasing the master lever, an actuator on said synchronizing member, and a flashlight circuit switch frictionally secured in the housing and quickly adjustable along the path of movement of said actuator, said switch comprising a pair of contacts, one of which is movable toward the other for closing the circuit and both of said contacts being insulated from the housing.

18. In a photographic shutter of the settable type, the combination with a housing, and a master lever which during its return movement after release effects opening and closing of the shutter, of a spring-operated synchronizing member, cooperating means on the master lever and synchronizing member acting to set and release the synchronizing member by respectively setting and releasing the master lever, an actuator on said synchronizing member, and a flashlight circuit switch adjustable along the path of movement of said actuator, said switch including a pair of contacts which are flexibly connected to and insulated from the housing.

19. In a photographic shutter, the combination with a spring-operated synchronizing member, an actuator carried by said synchronizing member, a flashlight circuit switch adjustable along the path of movement of said actuator, said switch comprising a pair of normally spaced spring contacts one of which is engageable by the aforementioned actuator, a second actuator movable to engage the other of said contacts and move it toward the first mentioned contact, a shutter controlling lever provided with means engageable with said second actuator, means on the shutter controlling lever engageable with the synchronizing member for setting it, spring means engaging and holding the synchronizing member in the path of the shutter controlling lever, the aforementioned switch being engageable with said spring means and acting to move it and release the synchronizing member from the path of the shutter controlling lever and thus disconnect the synchronizing member when the switch is adjusted into the path of said second actuator.

20. In a photographic shutter, the combination with a spring-operated synchronizing member, an actuator mounted on said synchronizing member, a flashlight circuit switch adjustable along the path of movement of said actuator and comprising a pair of normally spaced spring contacts one of which has a cam portion that is engageable by said actuator for an instant during travel of the latter in one direction, a second actuator movable to engage the other of said spring contacts and move it toward the first mentioned contact, a shutter controlling lever provided with means engageable with said second actuator, means on the shutter controlling lever engageable with the synchronizing member for setting it, spring means engaging and holding the synchronizing member in the path of the shutter controlling lever, the aforementioned switch being engageable with said spring means and acting to move it and release the synchronizing member from the path of the shutter controlling lever and thus disconnect the synchronizing member when the switch is adjusted into the path of said second actuator.

21. In a photographic shutter of the settable type, the combination with a master lever which during its return movement after release effects opening and closing of the shutter, of a spring-operated synchronizing member, cooperating means on the master lever and synchronizing member acting to set the synchronizing member by setting the master lever, an actuator on said synchronizing member, a flashlight circuit switch including a pair of normally spaced spring contacts one of which is engageable by the aforementioned actuator, a second actuator movable to engage the other of said contacts and to move it toward the first mentioned contact, means on said master lever engageable with said second actuator to move it during the latter part of the return movement of the master lever, means on the shutter controlling lever engageable with the synchronizing member for setting it, spring means engaging and holding the synchronizing member in the path of the shutter controlling lever, the aforementioned switch being engageable with said spring means and acting to move it and release the synchronizing member from the path of the shutter controlling lever and thus disconnect the synchronizing member when the switch is adjusted into the path of said second actuator.

22. In a photographic shutter of the settable type, the combination with a master lever which during its return movement after release effects opening and closing of the shutter, of a spring-operated synchronizing member, cooperating means on the master lever and synchronizing member acting to set the synchronizing member by setting the master lever, an actuator on said synchronizing member, an adjustable support, a flashlight circuit switch mounted on said adjustable support and comprising a pair of normally spaced spring contacts one of which is positionable in the path of movement of the actuator for closing the flashlight circuit, spring means acting to hold the synchronizing member in operative relation to the master lever for setting, a second actuator movable to engage the other of said contacts and close the circuit, and means on the master lever engageable with said second actuator during the latter part of the return movement of the master lever, said adjustable support being positionable to engage said spring means and said second actuator to effect movement of the synchronizing member and the second actuator out of the path of the master lever to permit operation of the shutter without affecting the flashlight circuit.

23. In a photographic shutter of the settable type, the combination with a master lever which during its return movement after release effects opening and closing of the shutter, of a spring-operated synchronizing member mounted to swing about a different axis from the master lever, cooperating means on the master lever and synchronizing member acting to set and release the synchronizing member by setting and releasing respectively the master lever, an adjustable support that is pivotally mounted coaxially with the synchronizing member, a flashlight circuit switch mounted on said adjustable support, and an actuator on the synchronizing member engageable with said switch.

24. In a photographic shutter of the settable type, the combination with a master lever which during its return movement after release effects opening and closing of the shutter, of a spring-operated synchronizing member mounted to swing about a different axis from the master lever, cooperating means on the master lever and synchronizing member acting to set and release the synchronizing member by setting and releasing respectively the master lever, an adjustable support that is pivotally mounted coaxially with the synchronizing member, a flashlight circuit switch mounted on said adjustable support, an actuator on the synchronizing member engageable with said switch, a second actuator movable to engage said switch, and means on the master lever engageable with said second actuator during the latter part of the return movement of the master lever.

25. In a photographic shutter of the settable type, the combination with a master lever which during its return movement after release effects opening and closing of the shutter, of a spring-operated synchronizing member, cooperating means on the master lever and synchronizing member acting to set the synchronizing member by setting the master lever, an actuator pivotally mounted on said synchronizing member, a flashlight circuit switch adjustable along the path of movement of said actuator and including a pair of normally spaced spring contacts one of which includes a cam portion that is engageable by the aforementioned actuator for an instant during travel of the latter in one direction, a second actuator movable to engage the other of said contacts and to move it toward the first mentioned contact, means on said master lever engageable with said second actuator to move it during the latter part of the return movement of the master lever, means on the shutter controlling lever engageable with the synchronizing member for setting it, spring means engaging and holding the synchronizing member in the path of the shutter controlling lever, the aforementioned switch being engageable with said spring means and acting to move it and release the synchronizing member from the path of the shutter controlling lever and thus disconnect the synchronizing member when the switch is adjusted into the path of said second actuator.

FRIEDRICH A. GUSTAV PIRWITZ.